(12) United States Patent
Haupt et al.

(10) Patent No.: US 6,434,641 B1
(45) Date of Patent: Aug. 13, 2002

(54) SYSTEM FOR REDUCING THE NUMBER OF REQUESTS PRESENTED TO A MAIN MEMORY IN A MEMORY STORAGE SYSTEM EMPLOYING A DIRECTORY-BASED CACHING SCHEME

(75) Inventors: Michael L. Haupt, Roseville; Mitchell A. Bauman, Circle Pines, both of MN (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/322,405

(22) Filed: May 28, 1999

(51) Int. Cl.[7] ............................................... G06F 12/08
(52) U.S. Cl. ........................... 710/54; 710/52; 710/39; 711/3; 711/150
(58) Field of Search .............................. 710/39, 40, 43, 710/54, 52, 59, 112, 240; 711/3, 147, 150, 151

(56) References Cited

U.S. PATENT DOCUMENTS

| | | | | |
|---|---|---|---|---|
| 3,938,097 A | * | 2/1976 | Niguette, III ................ | 711/128 |
| 4,805,098 A | * | 2/1989 | Mills, Jr. et al. ............ | 711/118 |
| 5,175,837 A | * | 12/1992 | Arnold et al. ................ | 711/152 |
| 5,561,781 A | * | 10/1996 | Braceras et al. ............. | 711/131 |
| 5,642,494 A | * | 6/1997 | Wang et al. .................. | 711/140 |
| 5,813,038 A | * | 9/1998 | Thome et al. ............... | 711/154 |
| 5,829,040 A | * | 10/1998 | Son ............................. | 711/146 |
| 5,832,304 A | * | 11/1998 | Bauman et al. ................ | 710/40 |
| 5,870,625 A | * | 2/1999 | Chan et al. ...................... | 710/5 |
| 6,112,319 A | * | 8/2000 | Paulson ........................ | 714/49 |
| 6,164,840 A | * | 12/2000 | Lynch ......................... | 712/207 |

\* cited by examiner

Primary Examiner—B. James Peikari

(74) *Attorney, Agent, or Firm*—Beth L. McMahon; Michael B. Atlass; Charles A. Johnson

(57) ABSTRACT

A memory request management system for use with a memory system employing a directory-based cache coherency scheme is disclosed. The memory system includes a main memory coupled to receive requests from multiple cache memories. Directory-based logic is used to determine that some requests presented to the main memory can not be completed immediately because the most recent copy of the requested data must be retrieved from another cache memory. These requests are stored in a temporary storage structure and identified as "deferred" requests. Subsequently, predetermined ones of the memory requests that are requesting access to the same main memory address as is being requested by any deferred request are also deferred. When a data retrieval operation is completed, an associated request is designated as undeferred so that processing for that request may be completed, and the request may be removed from the temporary storage structure. According to one aspect of the invention, all deferred requests requesting access to the same main memory address are stored as a linked list of requests in the temporary storage structure. Requests are processed by main memory in a first-in, first-out manner such that the oldest requests are completed before more recently-received requests. According to another aspect of the invention, the request management system further handles I/O overwrite operations wherein a peripheral device is allowed to overwrite requested addresses within the main memory even though the most recent copy of the data associated with some of the overwritten memory addresses is stored within ones of the cache memories. To process the I/O overwrite operations in a manner that preserves data coherency, the I/O overwrite requests are deferred in a manner that is similar to cache-initiated requests. Specifically, I/O overwrite requests made to an address associated with any previously-deferred I/O overwrite or cache-initiated requests are deferred until all such previously-deferred requests are processed by main memory.

19 Claims, 8 Drawing Sheets

Symmetrical Multiprocessing Platform

Figure 1 *Symmetrical Multiprocessing Platform*

Memory Storage Unit (MSU)

Processing Module (POD)

Sub-Processing Module (Sub-POD)

Memory Controller (MCA)

Defer Cam Logic

SYSTEM FOR REDUCING THE NUMBER OF REQUESTS PRESENTED TO A MAIN MEMORY IN A MEMORY STORAGE SYSTEM EMPLOYING A DIRECTORY-BASED CACHING SCHEME

CROSS-REFERENCE TO OTHER APPLICATIONS

The following co-pending applications of common assignee contain some common disclosure:

"High-Performance Modular Memory System with Crossbar Connections", filed Dec. 31, 1997, Ser. No. 09/001,592, incorporated herein by reference in its entirety; and "Directory-Based Cache Coherency System Supporting Multiple Instruction Processor and Input/Output Caches", Attorney Docket No. RA-5102, filed Dec. 31, 1997, Ser. No. 09/001,598, incorporated herein by reference in its entirety.

BACKGROUND OF THE INVENTION

1. Field of the Invention

This invention relates generally to a system for managing processor requests made to a shared main memory system that utilizes a directory-based cache coherency scheme; and, more specifically, to a system that utilizes information associated with previously deferred memory requests to determine that certain subsequently-received memory requests should also be temporarily deferred such that redundant memory coherency actions are prevented from being unnecessarily initiated, and so that memory operation is optimized.

2. Description of the Prior Art

Data processing systems are becoming increasing complex. Some systems, such as Symmetric Multi-Processor (SMP) computer systems, couple two or more Instruction Processors (IPs) and multiple Input/Output (I/O) Modules to shared memory systems. This allows the multiple IPs to operate simultaneously on the same task, and also allows multiple tasks to be performed at the same time to increase system throughput.

As the number of units coupled to a shared memory increases, more demands are placed on the memory and memory latency increases. To address this problem, high-speed cache memory systems are often coupled to one or more of the IPs for storing data signals that are copied from main memory. These cache memories are generally capable of processing requests faster than the main memory while also serving to reduce the number of requests that the main memory must handle. This increases system throughput.

While the use of cache memories increases system throughput, it causes other design challenges. When multiple cache memories are coupled to a single main memory for the purpose of temporarily storing data signals, some system must be utilized to ensure that all IPs are working from the same (most recent) copy of the data. For example, if a copy of a data item is stored, and subsequently modified, in a cache memory, another IP requesting access to the same data item must be prevented from using the older copy of the data item stored either in main memory or the requesting IP's cache. This is referred to as maintaining cache coherency. Maintaining cache coherency becomes more difficult as more caches are added to the system and more copies of a single data item must be managed.

Many methods exist to maintain cache coherency. Some earlier systems achieve coherency by implementing memory locks. That is, if an updated copy of data existed within a local cache, other processors are prohibited from obtaining a copy of the data from main memory until the updated copy was returned to main memory, thereby releasing the lock. For complex systems, the additional hardware and/or operating time required for setting and releasing the locks within main memory cannot be justified. Furthermore, reliance on such locks directly prohibits certain types of applications such as parallel processing.

Another method of maintaining cache coherency is shown in U.S. Pat. No. 4,843,542 issued to Dashiell et al., and in U.S. Pat. No. 4,755,930 issued to Wilson, Jr. et al. These patents each discuss a system wherein a processor having a local cache is coupled to a shared memory through a common memory bus. Each processor is responsible for monitoring, or "snooping", the common bus to maintain coherency of its own cache data. These snooping protocols increase processor overhead, and are unworkable in hierarchical memory configurations that do not have a common bus structure.

A similar snooping protocol is shown in U.S. Pat. No. 5,025,365 to Mathur et al., which teaches local caches that monitor a system bus for the occurrence of memory accesses which would invalidate a local copy of data. The Mathur snooping protocol removes some of overhead associated with snooping by invalidating data within the local caches at times when data accesses are not occurring, however the Mathur system is still unworkable in memory systems without a common bus structure.

Another method of maintaining cache coherency is shown in U.S. Pat. No. 5,423,016 to Tsuchiya. The method described in this patent involves providing a memory structure called a "duplicate tag" with each cache memory. The duplicate tags record which data items are stored within the associated cache. When a data item is modified by a processor, an invalidation request is routed to all of the other duplicate tags in the system. The duplicate tags are searched for the address of the referenced data item. If found, the data item is marked as invalid in the other caches. Such an approach is impractical for distributed systems having many caches interconnected in a hierarchical fashion because the time requited to route the invalidation requests poses an undue overhead.

For distributed systems having hierarchical memory structures, a directory-based coherency system becomes more practical. Directory-based coherency systems utilize a centralized directory to record the location and the status of data as it exists throughout the system. For example, the directory records which caches have a copy of the data, and further records if any of the caches are allowed to have an updated copy of the data. When a cache makes a request to main memory for a data item, the central directory is consulted to determine where the most recent copy of that data item resides. Based on this information, the most recent copy of the data is retrieved so it may be provided to the requesting cache. The central directory is then updated to reflect the new status for that unit of memory. A novel directory-based cache coherency system for use with multiple Instruction Processors coupled to a hierarchical cache structure is described in the co-pending application entitled "Directory-Based Cache Coherency System Supporting Multiple Instruction Processor and Input/Output Caches", Ser. No. 09/001,598 filed Dec. 31, 1997, which is incorporated herein by reference in its entirety.

As stated above, a main memory employing a directory-based coherency system is a practical way to maintain coherency within a hierarchical memory that includes multiple levels of cache. Moreover, this type of coherency system may be readily expanded to maintain coherency among a large number of cache memories. One problem with this type of coherency scheme, however, is that as the number of cache memories within the system increases, a larger percentage of the main memory bandwidth is consumed in the handling and management of various memory coherency actions. For example, a first processor may have the latest cached copy of a data item requested by the second processor. The main memory must initiate an operation to retrieve the data copy from the first processor before the request may be processed. In the mean time, a third processor may request the same data item from main memory, causing the main memory to again initiate an operation to attempt to retrieve the most recent data copy.

Not only does the initiation of coherency actions consume memory cycles, but it also requires the use of other system resources as well. The scheduling of requests for causing a processor to return data to the main memory requires the use of various queue structures within the memory control system. These requests must be processed by the memory controllers, and ultimately transferred across memory bus resources to the various cache memories. The cache memories process the requests and schedule the return of requested data to memory. This return operation again requires the use of memory bus resources.

As can be readily appreciated by the foregoing discussion, in a hierarchical memory employing a directory-based cache coherency structure, the occurrence of coherency operations decreases the rate at which the memory can process requests. The problem increases when multiple processors are grouped together to work on a single task that requires the sharing of data, If multiple processors are each requesting the use of the same data item within a short period of time, coherency actions are initiated that may significantly impact memory throughput.

The problem associated with maintaining cache coherency can be further complicated in systems that allow I/O units to overwrite main memory segments at the same time valid copies of the data are stored in local caches. Although the use of these types of I/O overwrite operations provides a mechanism for efficiently updating main memory data, it further increases the number of coherency actions that must be performed within the system. This is because coherency operations must be initiated to flush all outdated cached data copies from the caches.

What is needed is a memory that incorporates the advantages of a directory-based coherency system, but which minimizes the number of coherency actions that must be initiated when multiple processors are requesting access to the same memory data simultaneously.

OBJECTS

The primary object of the invention is to provide an improved system for managing requests made to a shared main memory;

Another object of the invention is to provide an system for minimizing the number of coherency actions that are initiated by a shared main memory that utilizes a directory-based cache coherency scheme;

A still further object of the invention is to minimize the number of redundant memory coherency actions that must be unnecessarily processed by the caches residing within a shared main memory system employing a directory-based cache coherency scheme;

A yet further object of the invention is to minimize the number of memory requests that are deferred after being presented to a shared main memory;

A further object of the invention is to provide a system for determining when a request to a shared main memory is to be deferred without providing the request to memory;

A yet further object of the invention is to provide a request storage system for maintaining memory coherency through the use of linked lists of deferred memory requests;

A still further object of the invention is to provide a system for optimizing the performance of a shared main memory by filtering requests that are provided to the memory using information associated with other deferred memory requests; and Another object of the invention is to provide a system for handling deferred memory requests received from both Instruction Processors and Input/Output Processors in a manner that maintains memory coherency.

SUMMARY OF THE INVENTION

The objectives of the present invention are achieved in a memory request management system for use with a memory system that employs a directory-based cache coherency scheme. The current memory system includes a main memory coupled to multiple cache memories. The main memory receives requests from each of the multiple cache memories to write data to, and fetch data from, addressable memory locations. In some cases, it is determined after a memory fetch request is presented to memory that the request can not be processed immediately because the most recent copy of the requested data is stored in another cache memory. The memory must therefor initiate retrieval of that most recent data copy before the request may be completed. During this data retrieval, the associated fetch request is stored in a temporary storage structure and identified as "deferred".

Sometimes, additional read requests are received for the same data item as was previously requested by one or more deferred requests. According to the current invention, the subsequently-received read requests are also stored in the temporary storage structure and marked as deferred without being presented to memory. In this manner, fetch requests may be deferred without having to present those requests to the main memory. This provides many advantages. Memory cycles are not wasted determining that a request can not be immediately processed. Additionally, overhead associated with initiating a redundant and unnecessary data retrieval operation is not imposed on the memory control logic. Unnecessary data retrieval requests initiated by main memory to ones of the caches are eliminated, thus conserving cycles on the memory-to-processor buses. Processing overhead is eliminated within the memory cache controllers, and unnecessary cache response cycles are eliminated on the processor-to-memory buses.

According to one aspect of the invention, when a data retrieval operation is completed, an associated request is designated as undeterred. In some instances, the returned data may be immediately provided to the requester, and the undeterred request is therefor considered complete and may be removed from the temporary storage structure. In other cases, the undeferred request is presented to the main memory for completion and then removed from the temporary storage structure. After removal of a request, any other deferred request that was requesting the same data item as the newly-completed request becomes eligible for processing.

According to another aspect of the invention, requests stored within the temporary storage structure as deferred requests and which are associated with the same requested data item are stored as a linked list of requests. The oldest request is at the front of the linked list, with subsequently-received requests being chained to the linked list in the order the requests are received. The requests are processed by main memory in a first-in, first-out manner such that the oldest requests are completed before more recently-received requests.

The memory system of the preferred embodiment further supports I/O overwrite operations wherein a peripheral device is allowed to overwrite data stored at requested addressable locations within the main memory even when some of the most recent data items associated with the overwritten memory addresses reside within ones of the cache memories. To handle the I/O overwrite operations in a manner the preserves data coherency, the I/O overwrite requests are deferred in a manner that is similar to fetch requests. Specifically, I/O overwrite requests made to an address associated with a previously deferred request are stored in the temporary storage structure and designated as deferred. In the preferred embodiment, a deferred I/O overwrite request is not processed until all older deferred requests to the same memory address have been completed.

Still other objects and advantages of the present invention will become readily apparent to those skilled in the art from the following detailed description of the preferred embodiment and the drawings, wherein only the preferred embodiment of the invention is shown, simply by way of illustration of the best mode contemplated for carrying out the invention. As will be realized, the invention is capable of other and different embodiments, and its several details are capable of modifications in various respects, all without departing from the invention. Accordingly, the drawings and description are to be regarded to the extent of applicable law as illustrative in nature and not as restrictive.

BRIEF DESCRIPTION OF THE FIGURES

The present invention will be described with reference to the accompanying drawings.

DETAILED DESCRIPTION OF THE PREFERRED EMBODIMENTS

System Platform

Figure 1:
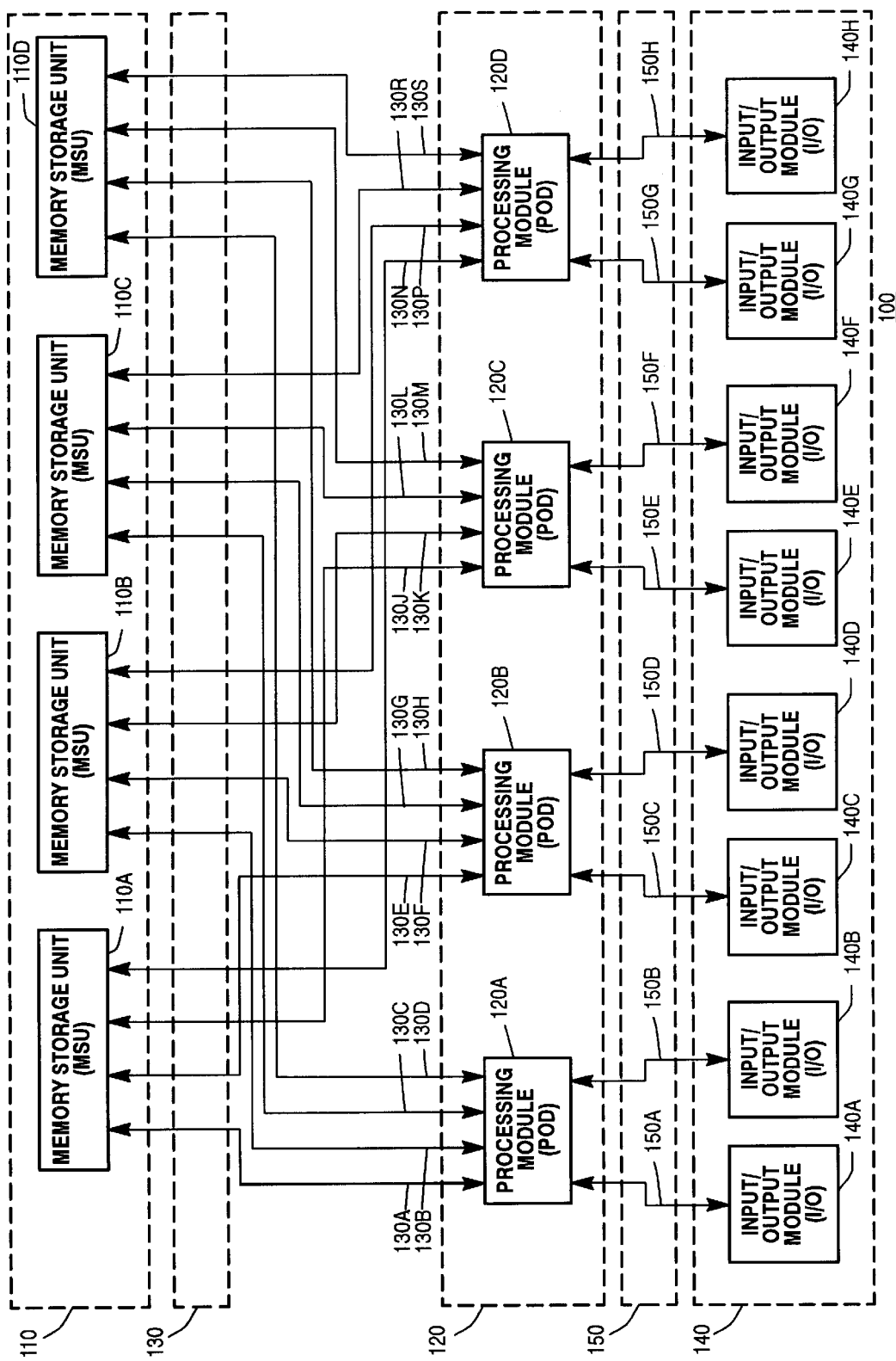
FIG. 1 is a block diagram of a Symmetrical MultiProcessor (SMP) system platform according to a preferred embodiment of the present invention.

FIG. 1 is a block diagram of a Symmetrical Multi-Processor (SMP) System Platform according to a preferred embodiment of the present invention. System Platform 100 includes one or more Memory Storage Units (MSUs) in dashed block 110 individually shown as MSU 110A, MSU 110B, MSU 110C and MSU 110D, and one or more Processing Modules (PODs) in dashed block 120 individually shown as POD 120A, POD 120B, POD 120C, and POD 120D. Each unit in MSU 110 is interfaced to all PODs 120A, 120B, 120C, and 120D via a dedicated, point-to-point connection referred to as an MSU Interface (MI) in dashed block 130, individually shown as 130A through 130S. For example, MI 130A interfaces POD 120A to MSU 110A, MI 130B interfaces POD 120A to MSU 110B, MI 130C interfaces POD 120A to MSU 110C, MI 130D interfaces POD 120A to MSU 110D, and so on.

In one embodiment of the present invention, MI 130 comprises separate bi-directional data and bi-directional address/command interconnections, and further includes unidirectional control lines that control the operation on the data and address/command interconnections (not individually shown). The control lines run at system clock frequency (SYSCLK) while the data bus runs source synchronous at two times the system clock frequency (2×SYSCLK). In a preferred embodiment of the present invention, the system clock frequency is 100 megahertz (MHZ).

Any POD 120 has direct access to data in any MSU 110 via one of MIs 130. For example, MI 130A allows POD 120A direct access to MSU 110A and MI 130F allows POD 120B direct access to MSU 110B. PODs 120 and MSUs 110 are discussed in further detail below.

System Platform 100 further comprises Input/Output (I/O) Modules in dashed block 140 individually shown as I/O Modules 140A through 140H, which provide the interface between various Input/Output devices and a respective one of the PODs 120. Each I/O Module 140 is connected to the respective one of the PODs across a dedicated point-to-point connection called the MIO Interface in dashed block 150 individually shown as 150A through 150H. For example, I/O Module 140A is connected to POD 120A via a dedicated point-to-point MIO Interface 150A.

Memory Storage Unit

Figure 2:
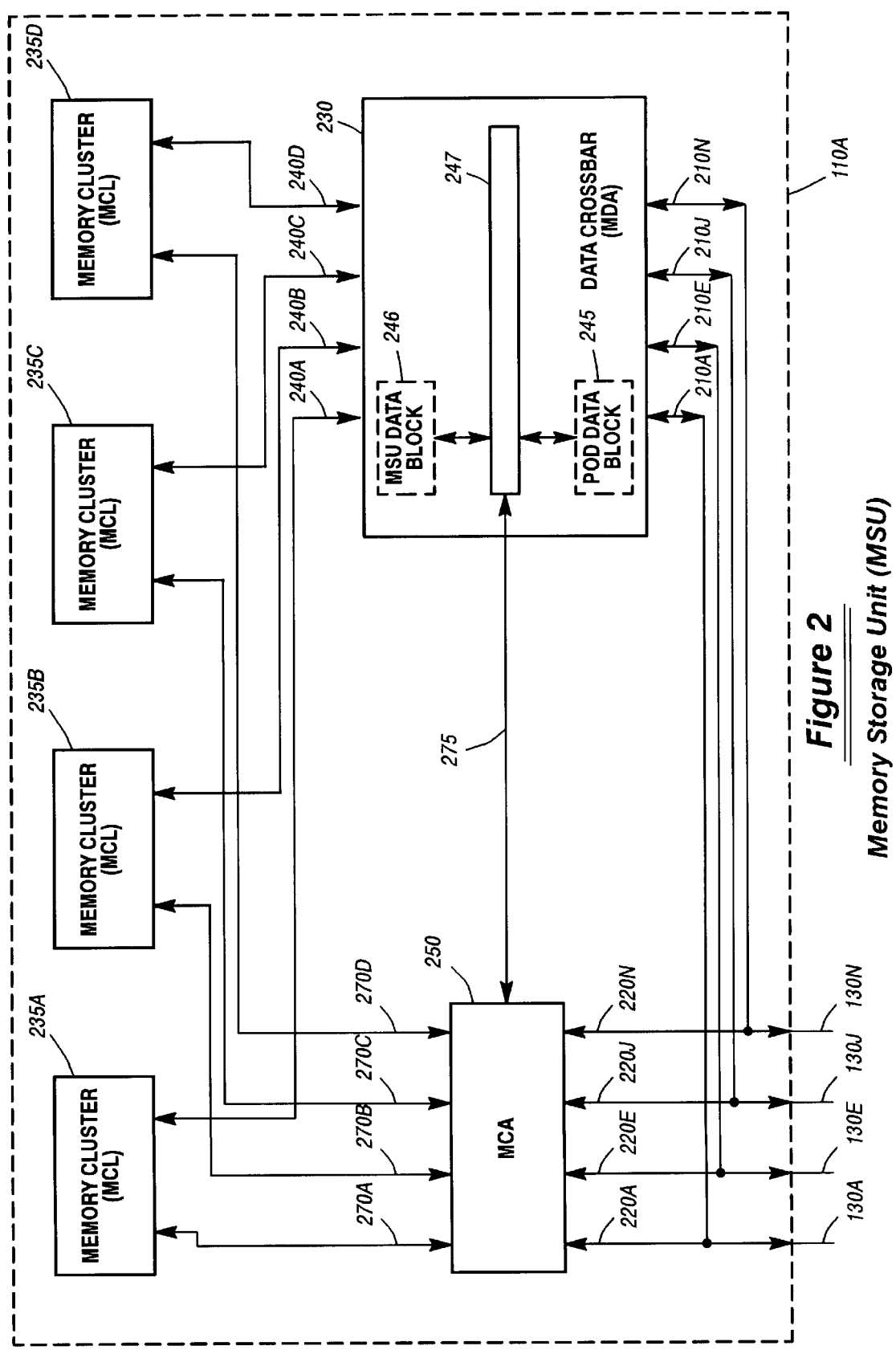
FIG. 2 is block diagram of a Memory Storage Unit (MSU)

FIG. 2 is a block diagram of a Memory Storage Unit (MSU) 110. Although MSU 110A is shown and discussed, it is understood that this discussion applies equally to each of the MSUs 110. As discussed above, MSU 110A interfaces to each of the PODs 120A, 120B, 120C, and 120D across dedicated point-to-point MI Interfaces 130A, 130E, 130J, and 130N, respectively. Each MI Interface 130 includes two separate, independently-operative interfaces. The first interface is shown as Data Interface 210 (illustrated as 210A, 210E, 210J, and 210N). Each set of Data Interfaces 210 includes bi-directional data bits, parity signals, and uni-directional control signals (not individually shown in FIG. 2). In addition to a Data Interfaces 210, each MI Interface 130 includes a bi-directional Address/function Interface 220 (shown as 220A, 220E, 220J, and 220N), each of which includes address/function signals, uni-directional control signals, and a unidirectional address request (not individually shown in FIG. 2).

Data Interface 210A, 210E, 210J, and 210N interface to the Memory Data Crossbar (MDA) 230. The MDA 230 buffers data signals received on Data Interfaces 210 from the PODs 120, and provides the switching mechanism that may route these buffered data signals to an addressed one of the storage units called Memory Clusters (MCLs) 235 (shown as 235A, 235B, 235C, and 235D) via Bi-directional Interfaces 240 (shown as 240A, 240B, 240C, and 240D). Data signals are also returned from MCLs 235 to a requesting POD 120 via Bi-directional Interfaces 240 and MDA 230. The control logic associated with this routing operation is beyond the scope of this patent.

In addition to routing data signals between various ones of the PODs 120 and ones of the MCLs 235, the MDA 230 also routes buffered ones of the data signals received from any of the PODs to any other selectable one of the PODs during POD-to-POD transfer operations. For example, data signals received from POD 120A and buffered by MDA 230 may be routed to Data Interface 210E, 210J, or 210N for reception by POD 120B, 120C, or 120D, respectively. These POD-to-POD transfers are discussed further below.

The MDA buffers the data signals provided by PODs 120 via Data Interfaces 210 in POD Data Block structures. A different structure is provided for each of the Data Interface 210A, 210E, 210J, and 210N. In FIG. 2, the POD Data Block structure associated with Data Interface 210A is shown as POD Data Block 245. Similar queue structures (not shown) exist for the other Data Interfaces 210E, 210J, and 210N. POD Data Block 245 can be any addressable storage device capable of storing a predetermined maximum number of data signals.

The MDA also buffers the data signals provided by MCLs 235 via Data Lines 240 in MSU Data Block structures. In FIG. 2, the MSU Data Block structure associated with Data Lines 240A is shown as MSU Data Block 246, with similar MSU Data Block structures (not shown) being provided for the other Data Lines 240B, 240C, and 240D. MSU Data Block 246 can be any addressable storage device capable of storing a predetermined maximum number of data signals.

Whereas the MDA 230 buffers data signals provided via Data Interfaces 210 and Data Lines 240, the Memory Controller (MCA) 250 buffers the address and control signals associated with POD-to-MSU requests that are provided via Address/function Interfaces 220. The requests are buffered until the addressed one of the MCLs 235 is ready to receive the request on Address Lines 270 (shown as 270A, 270B, 270C, and 270D). At this time, MCA 250 provides the address and control signals to the addressed one of the MCLs 235, and also provides Control Signals 275 to Data Queue Interconnect Logic 247. Control Signals 275 provide all the data routing control to logically connect a selected one of the POD Data Blocks to a selected one of the MSU Data Blocks, and to also initiate sequences to move the data from a MSU Data Block 246 to a MCL 235. For example, data can be transferred from POD Data Block 245 to MSU Data Block 246 in preparation to perform a memory write operations to MCL 235A. In the case of a fetch operation, no data is initially provided with the request, and instead data is returned from the address MCL 235 at the conclusion of the request processing.

Processing Module (POD)

Figure 3:
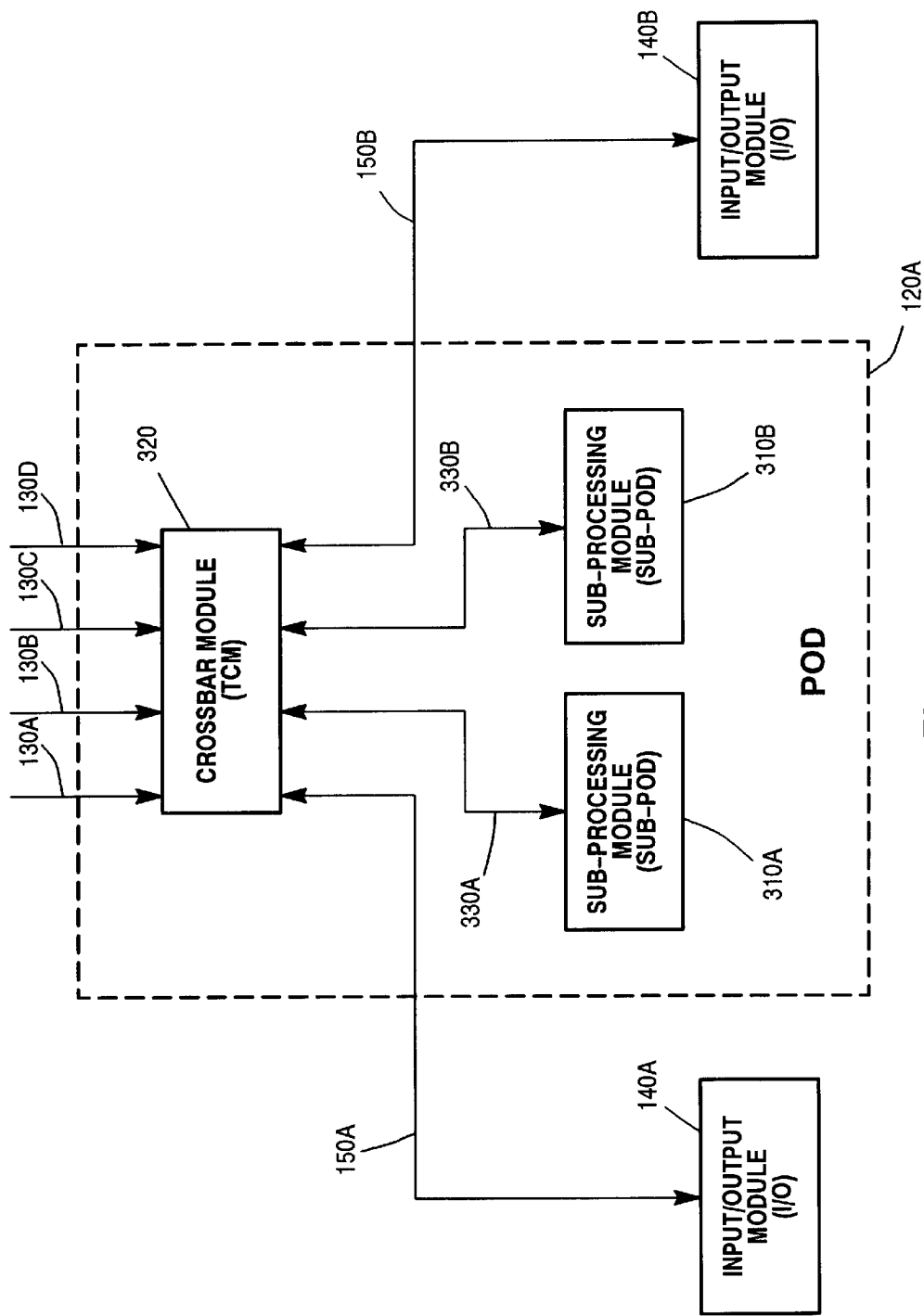
FIG. 3 is a block diagram of a Processing Module (POD) according to one embodiment of the present invention.

FIG. 3 is a block diagram of a processing module (POD) according to one embodiment of the present invention. POD 120A is shown, but each of the PODs 120A through 120D has a similar configuration. POD 120A includes two Sub-Processing Modules (Sub-PODs) 310A and 310B. Each of the Sub-PODs 310A and 310B is interconnected to a Crossbar Module (TCM) 320 through dedicated point-to-point Interfaces 330A and 330B, respectively, that are similar to the MI interconnections 130. TCM 320 further interconnects to one or more I/O Modules 140 (shown as I/O Modules 140A and 140B) via the respective point-to-point MIO Interfaces 150 (shown as MIO Interfaces 150A and 150B). TCM 320 both buffers data and functions as a switch between Interfaces 330A, 330B, 150A, and 150B, and MI Interfaces 130A through 130D. An I/O Module 140 or a Sub-POD 310 is interconnected to one of the MSUs via the TCM 320 based on the address provided by the I/O Module or the Sub-POD, respectively. In general, the TCM maps one-fourth of the memory address space to each of the MSUs 110A through 110D.

Sub-Processing Module

Figure 4:
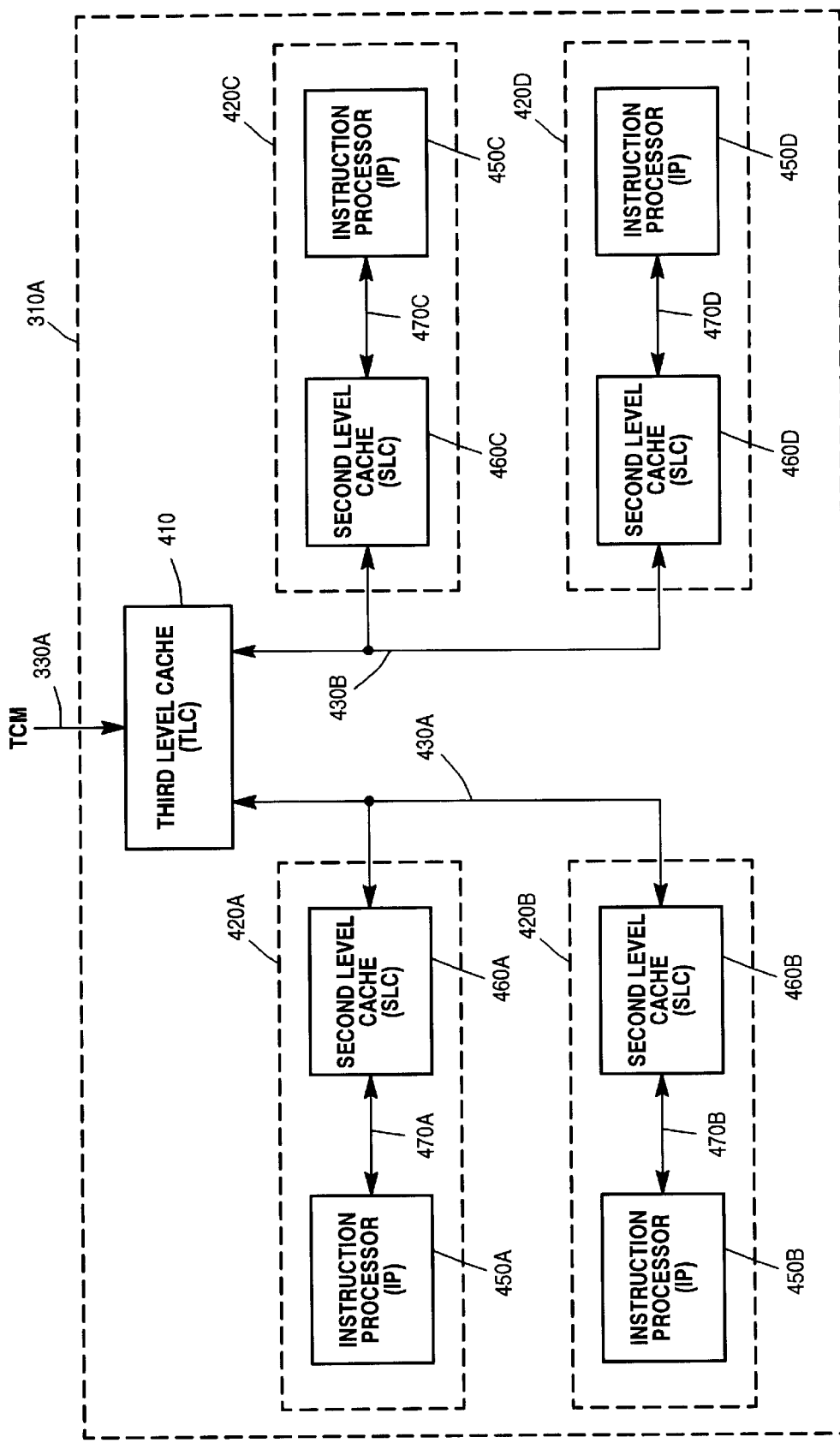
FIG. 4 is block diagram of a Sub-Processing Module (Sub-POD) according to one embodiment of the present invention.

FIG. 4 is a block diagram of a Sub-Processing Module (Sub-POD) according to one embodiment of the present invention. Sub-POD 310A is shown, but it is understood that all Sub-PODs 310 have similar structures and interconnections. In this embodiment, Sub-POD 310A includes a Third-Level Cache (TLC) 410 and one or more Coherency Domains 420 (shown as Coherency Domains 420A, 420B, 420C, and 420D). TLC 410 is connected to Coherency Domains 420A and 420B via Bus 430A, and is connected to Coherency Domains 420C and 420D via Bus 430B. TLC 410 caches data from the MSU, and maintains data coherency among all of Coherency Domains 420, guaranteeing that each processor is always operating on the latest copy of the data.

Each Coherency Domain 420 includes an Instruction Processor (IP) 450 (shown as IPs 450A, 450B, 450C, and 450D), and a Second-Level Cache (SLC) 460 (shown as SLC 460A, 460B, 460C and 460D.) Each SLC interfaces to an IP via a respective point-to-point Interface 470 (shown as Interfaces 470A, 470B, 470C, and 470D), and each SLC further interfaces to the TLC via Bus 430 (shown as 430A and 430B). For example, SLC 460A interfaces to IP 450A via Interface 470A and to TCL 410 via Bus 430A. Similarly, SLC 460C interfaces to IP 450C via Interface 470C and to TCL 410 via Bus 430B. Each SLC caches data from the TLC as requested by the interconnecting IP 450.

IP 450 and SLC 460 may be integrated in a single device, such as in a Pentium Pro® processing device available from the Intel Corporation. Alternatively, the IP 450 may be an A-Series Instruction Processor or a 2200-Series Instruction Processor, both commercially available from the Unisys Corporation. In this embodiment, the IP 450 is externally coupled to an SLC 460.

In the preferred embodiment, IP 450 includes an internal First Level Cache. For example, a Pentium Pro® processing device available from the Intel Corporation includes an internal FLC as well as an SLC. In other embodiments of the present invention, IPs 450 may each utilize an external FLC or not include an FLC at all. Furthermore, in other embodiments of the present invention, each Coherency Domain 420 may includes more successive levels of cache so that multiple caches exist between TLC 410 and IP 450.

Directory Coherency Scheme of the Preferred Embodiment

Before discussing the system architecture in more detail, the data coherency scheme of the current system is discussed. Data coherency involves ensuring that each POD 120 operates on the latest copy of the data. Since multiple copies of the same data may exist within platform memory, including the copy in the MSU and additional copies in various local cache memories (local copies), some scheme is needed to control which data copy is considered the "latest" copy. The platform of the current invention uses a directory protocol to maintain data coherency. In a directory protocol, information associated with the status of units of data is stored in memory. This directory status, or "state", information is monitored and updated by a controller when a unit of data is requested by one of the PODs 120. In one embodiment of the present invention, this information includes the status of each 64-byte segment, or "cache line", of data. The status is updated when a copy of a cache line is granted to one of the PODs as the result of that POD fetching the data during a Fetch operation. The directory state information includes a vector that indicates the identity of the POD(s) having local copies of the cache line.

In the present invention, the status of the cache line includes a "shared" and an "exclusive" status indicator. The shared status indicator, when set, indicates that one or more PODs have a local copy of the cache line for read-only purposes. A POD that acquired shared access to a cache line as a result of making a fetch request may not update the cache line. Thus, for example, PODs 120A and 120B may have shared access to a cache line such that a copy of the cache line exists in the Third-Level Caches 410 of both PODs for read-only purposes.

In contrast to the shared status indicator, the exclusive status indicator indicates that only one POD "owns" the cache line. A POD must request, and be granted, this "exclusive ownership" of a cache line during a fetch request before data within the cache line may be modified. When a POD has exclusive ownership of a cache line, no other POD may have a copy of that cache line in any of its associated caches.

Before a POD can gain exclusive ownership of a cache line during a fetch request, any other PODs having copies of that cache line must complete any in-progress operations to that cache line. Then, if one or more POD(s) have shared access to the cache line, the POD(s) must designate their local copies of the cache line as invalid. This is known as a purge operation. If, on the other hand, a single POD has exclusive ownership of the requested cache line, and the local copy has been modified, the local copy must be returned to the MSU before the new POD can gain exclusive ownership of the cache line. This is known as a "return" operation, since the previous exclusive owner returns the cache line to the MSU so it can be provided to the requesting POD, which becomes the new exclusive owner. In addition, the updated cache line is written to the MSU sometime after the return operation has been performed, and the directory state information is updated to reflect the new status of the cache line data. In the case of either a purge or return operation, the POD(s) having previous access rights to the data may no longer use the old local copy of the cache line, which is invalid. These POD(s) may only access the cache line after regaining access rights in the manner discussed above.

In addition to return operations, PODs also provide data to be written back to an MSU during flush operations. When a POD receives a cache line from an MSU, and the cache line is to be copied to a cache that is already full, space must be allocated in the cache for the new data. Therefore, a predetermined algorithm is used to determine which older cache line(s) will be disposed of, or "aged out of", cache to provide the amount of space needed for the new information. If the older data has never been modified, it may be merely overwritten with the new data. However, if the older data has been modified, the cache line including this older data must be written back to the MSU 110 by making a request to perform a flush operation so that this latest copy of the data is preserved.

Data is also written to an MSU 110 during I/O overwrite operations. An I/O overwrite occurs when one of the I/O Modules 140 issues an I/O overwrite command to the MSU. This causes data provided by the I/O Module to overwrite the addressed data in the MSU. The overwrite operation is performed regardless of which other PODs have local copies of the data when the overwrite operation is performed. The directory state information is updated to indicate that the affected cache line(s) is owned by the MSU, and to further indicate that no valid copies of the cache line exist anywhere else in the system.

In addition to having ownership following an overwrite operation, the MSU is also said to have ownership of a cache line when the MSU has the most current copy of the data and no other agents have a valid local copy of the data. This could occur, for example, after a POD having exclusive data ownership performs a flush operation of one or more cache lines so that the MSU thereafter has the only valid copy of the data.

Memory Controller

Figure 5:
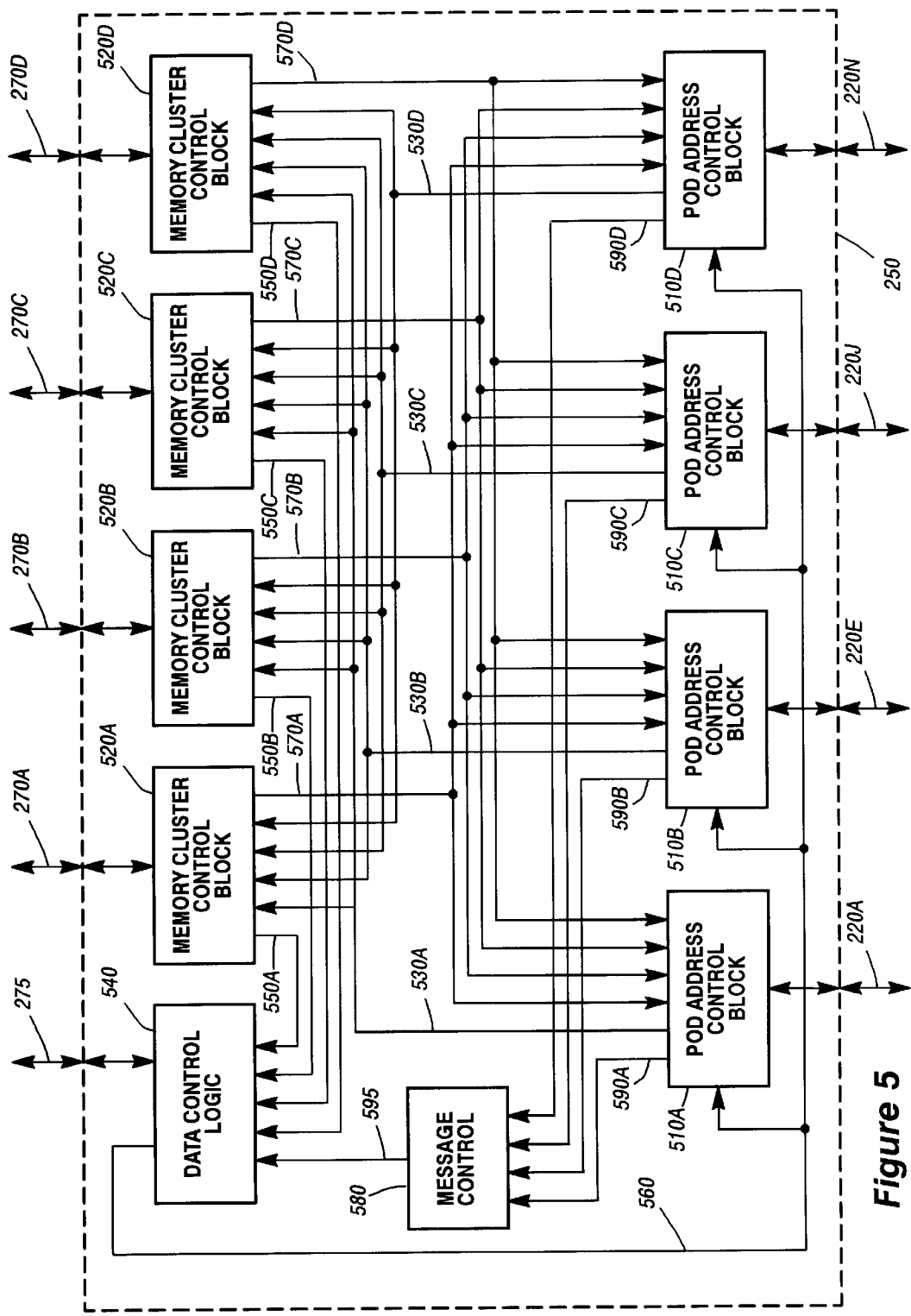
FIG. 5 is a block diagram of the Memory Controller (MCA)

FIG. 5 is a block diagram of the Memory Controller (MCA) 250. Although the following discussion specifically describes logic within MSU 110A, it is understood that this discussion applies equally to all MCAs included within all MSUs within Platform 100.

As discussed above, MCA 250 buffers the address and control signals associated with a memory request until the request may be routed to the addressed one of the MCLs 235. The address and control signals are received from a respective one of the PODs 120 on an associated one of the Address/command Lines 220, and are buffered in a respective one of the POD Address Control Blocks 510A, 510B, 510C, and 510D. For example, POD 120A provides an address and command over Address/command Lines 220A to POD Address Control Block 510A, and so on. The request information is stored in the respective one of the POD Address Control Blocks until it is selected as being associated with the next request to process.

When an address is selected as the next request address to process, it is provided to a selected one of the Memory Cluster Control Blocks 520A, 520B, 520C, and 520D via unidirectional address/control signals shown as Lines 530A, 530B, 530C, and 530D, respectively, based on the address associated with the request. In a fully populated MSU, each of the Memory Cluster Control Blocks handles one-fourth of the address range of the MSU. The selected Memory Cluster Control Block stores the request address and control signals until the request is selected for presentation to the associated MCL 235A, 235B, 235C, and 235D, respectively, across Address Lines 270A, 270B, 270C, and 270D, respectively. For example, addresses from Memory Cluster Control Block 520A are presented to MCL 235A across Address Lines 270A, and so on.

When a Memory Cluster Control Block 520 selects an address for transfer to one of the MCLs 235, the Memory Cluster Control Block makes a request to Data Control Logic 540 on an associated one of the Request Lines 550A, 550B, 550C, and 550D. For example, prior to a transfer of an address from Memory Cluster Control Block 520A to MCL 235A, Memory Cluster Control Block makes a request on Line 550A to Data Control Logic 540. In response, Data Control Logic 540 provides the necessary control information on Line 275 to the MDA to control any associated data transfer. This occurs as the address is provided by the associated one of the Memory Cluster Control Blocks 520 to the respectively associated MCL 235.

Turning now to the operation of the MCA 250 during Fetch operations, Fetch operations are initiated in the same manner as described above. One of the PODs 120 provides the request address to the respective one of the POD Address Control Blocks 510, where the address is queued, and eventually transferred to the addressed Memory Cluster Control Block 520. When the address is selected as the next address to be presented to the associated MCL 235, the Memory Cluster Control Block 520 issues a request to the Data Control Logic 540. Sometime after the request is made, the Data Control Logic 540 provides the associated control to the MDA 230 on Line 275 to enable the appropriate MSU Data Block 246 to receive the cache line from the addressed MCL 235.

In addition to the cache line, the MCL also provides directory state information from the addressed one of the MCLs to the MCA 250 over the respective set of Address Lines 270. Logic in the associated Memory Cluster Control Block uses the directory state information to determine if the cache line is Present in the MSU 110, meaning that the MSU "owns" the latest copy of the cache line data. If the MSU does own the requested cache line, the MCA controls the transfer of the cache line from the MSU Data Block 246 to the POD Data Block 245 associated with the requesting POD, and further controls the subsequent transfer of the cache line to the requesting POD. As the data is being provided to the POD Data Block 245, POD Address Control Block 510 issues the required response to the POD for the transfer, as will be discussed below. This response is generated to the requesting POD when the first data transfer for a cache line is provided on lines 210.

As discussed above, a POD may also initiate a Fetch operation for a cache line that the MSU does not own. If the directory state information retrieved from the addressed MCL 235 indicates another POD has exclusive ownership of that data, the MCA controls initiation of a return operation. This results in the retrieval of the latest copy of the cache line from the POD 120 that owns the data. In these cases, the MCA transfers the address associated with the requested cache line from the Memory Cluster Control Block 520 to the one of the POD Address Control Blocks 510A, 510B, 510C or 510D that is associated with the POD that owns the data. This transfer is accomplished over the associated one of the interfaces shown on Lines 570A, 570B, 570C, or 570D. The POD Address Control Block stores the pending request address until it can be presented to the associated POD over bi-directional Address/command Lines 220 along with a function code indicating that a return operation should be performed by the POD.

When an address and an associated return function are presented to a POD 120 over the associated Address/command Lines 220, the address is forwarded to the cache (either the Third Level Cache 410 or a Second Level Cache 460) that stores the current copy of the data in a manner which is beyond the scope of this invention. For more information on cache coherency in Platform 100 of the present invention, see the co-pending Application entitled "Directory-Based Cache Coherency System Supporting Multiple Instruction Processor and Input/Output Caches", Ser. No. 09/001,598 filed Dec. 31, 1997. After any in-progress operations are completed on the requested cache line, it is returned to the MSU 110 on the associated one of Data Lines 210.

When a POD 120 returns a cache line in response to a return function being issued, it is stored within the POD Data Block for that POD. Associated address and control signals are stored within the MCA. When the return request is selected for processing, Data Control Logic 540 generates control signals on Line 275 to cause the cache line to be transferred from the POD Data Block associated with the POD returning the data to the POD Data Block associated with the POD requesting the data. For example, assuming POD 120A is performing the return operation and POD 120B is requesting the returned data. The data will be routed from POD Data Block 245 to the POD Data Block associated with POD 120B (not shown in FIG. 2) so that the data can be provided to POD 120B. The manner in which this routing operation occurs is beyond the scope of the present invention. In addition to routing the data to the requesting POD, the MCA 250 controls the transfer of the cache line from the POD Data Block which is associated with the previous owner to the appropriate MSU Data Block associated with the cache line address, and finally to the addressed MCL 235 so that the latest copy of the returned data may be stored in the MSU. At this time, the Memory Cluster Control Block 520 associated with the addressed MCL 235 generates updated directory state information that reflects the new access status of the data. This updated directory state information is written back to the addressed MCL over Lines 270.

In another instance, a POD may initiate a Fetch operation for a cache line that the MSU does not own, but that is resident in a shared access state in one or more other caches. In this case, the MSU has the most recent copy of the data since data held under shared access may not be modified. The MSU may therefore provide the data to the requesting POD in the manner discussed above. In addition, if the Fetch operation requested exclusive access status, a purge function must be issued to the POD(s) having the shared local copies, thereby causing these POD(s) to invalidate their local copy.

System for Reducing the Number of Requests Made to Memory

In the system described above, maximizing system performance depends largely on maximizing the number of requests that can be serviced by each of the MCLs in any given period of time. This is because memory bandpass is the factor the generally limits overall system performance. One manner of maximizing memory performance involves preventing certain requests from being presented to an MCL if those requests can be processed (at least in a temporary sense) without providing them to the MCL. By performing this request filtering function, the overall performance of the memory will be increased. The system for performing this filtering function is discussed in detail in reference to FIG. 6.

Figure 6:
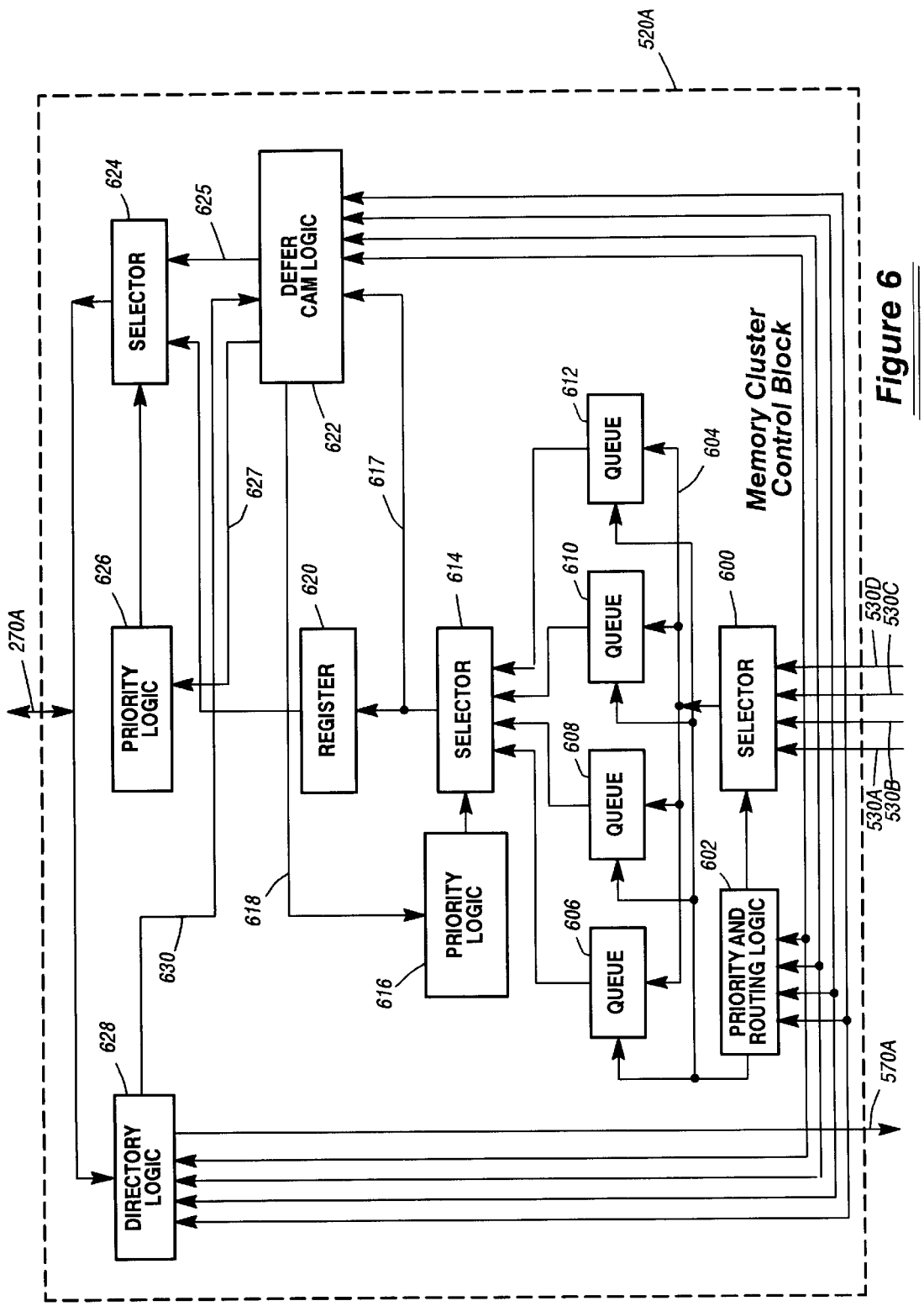
FIG. 6 is a block diagram of Memory Cluster Control Block.

FIG. 6 is a block diagram of Memory Cluster Control Block 520A. Although Memory Cluster Control Block 520A is shown and described, it is understood that the following description applies equally to any of the Memory Cluster Control Blocks. Memory Cluster Control Block 520A receives respective control and address signals from each of the POD Address Control Blocks 510A, 510B, 510C, and 510D on Lines 530A, 530B, 530C, and 530D, respectively. These control and address signals are provided to Selector 600, which selects one of the sets of control and address signals as dictated by a predetermined priority scheme utilized by Priority and Routing Logic 602. The priority scheme could be a round-robin scheme in which each of the PODs receives equal access, or could be any other type of priority algorithm. The selected signals are gated onto Line 604, and are provided to a selected one of Queues 606, 608, 610, or 612 as dictated by the request address.

In the preferred embodiment of Platform 100, each of the MCLs 235 includes four memory banks wherein each memory bank occupies one-fourth of the address space of the MCL. In a manner that is largely beyond the scope of the current application, requests to these four memory banks may be interleaved. A request to each memory bank requires twenty clock cycles to complete, where a clock cycle in the preferred embodiment is ten nanoseconds. If requests are interleaved to each of the four memory banks, a request completes every fifth clock cycle.

Each of Queues 606, 608, 610, and 612 is associated with a respective one of the four memory banks within MCL 235A. In the system of the preferred embodiment, the requests stored within each of the Queues are sorted such that those requests associated with the same type of memory operation, for example, all fetch requests, will be performed in the order in which they were received. However, among requests of different types, the requests need not be processed in order. For example, a first fetch request will always be processed prior to a second fetch request that was received later than the first request. However, the first fetch request may be processed after a write request that was received subsequent to the first fetch request. This requirement is necessary to maintain data coherency within the system. Priority logic included within each of Queues 606, 608, 610, and 612 determines which of the requests within the respective Queue will be processed next.

Each of Queues 606–612 provides the next request to be processed to Selector 614. Priority Logic 616 conditions Selector 614 to select one of these requests. Priority Logic 616 utilizes Hit Signal 618 and internal state information to determine when any one of the four memory banks included in MCL 235A is ready to receive another request, and based on this determination selects the next request to process.

The selected request is provided from Selector 614 to Register 620. Certain types of requests, including fetch requests for requesting read data from memory, are further provided to Defer CAM Logic 622 on Line 617. If the request is a fetch, Defer CAM Logic temporarily stores the address of the requested data. In some instances, Defer CAM Logic also determines, based on the contents of the Defer CAM Logic, whether or not the memory is currently able to process the request. If the memory can not process the request, it is stored in the Defer CAM Logic 622 and marked as deferred until such a time as it is determined that the request can be presented to memory. By deferring the request in this manner, memory throughput is increased since the request need not be presented to MCL 235A to determine that the request can not be immediately processed. The operations of Defer CAM Logic 622 will be discussed in detail below.

If a request is deferred, the address and control signals associated with the request are stored within Defer CAM Logic 622, and Hit Signal 618 is generated to cause Priority Logic 616 to enable Selector 614 to select another request. Another request is loaded into Register 620 and may be provided to Defer CAM Logic 622 in the manner discussed above, depending on request type. This second request is available to be provided to the addressed memory bank within MCL 235A at the start of the next twenty-cycle window such that no memory delay is imposed by the deferring of the previous request. This will be described further below in reference to Defer CAM Logic 622 timing.

If a request is not deferred, it is provided by Register 620 to Selector 624. Selector 624 may also receive on Line 625 a previously deferred request stored in Defer CAM Logic 622. Priority Logic 626 causes Selector 624 to select either the request from Register 620 or the request provided by Defer CAM Logic 622 on Line 625. In general, a request that had been deferred but which is now ready for processing, as is provided on Line 625, has higher priority than a request presented by Register 620. Priority Logic 626 receives an indication that a formerly-deferred request is ready for processing via the control signal on Line 627. The generation of this signal is discussed further below. The request selected by Priority Logic 626 is provided on Address Lines 270A to the addressed one of the four memory banks included in MCL 235A.

As described above, the current system uses a directory protocol to maintain data coherency within memory. According to this scheme, directory state information is stored within each of the MCLs 235 for each 64-byte cache line of data. The directory state information associated with the requested address is provided to Directory Logic 628 via Address Lines 270A during any memory operation involving MCL 235A. Directory Logic determines whether the directory state information indicates that the requested cache line is owned by the MSU so that the operation may be completed. In some instances, the requested address is exclusively owned by a POD other than the POD making the request, and the request may therefore not be completed at that instant in time. In these situations, the request is deferred. (It may be noted that although the Defer CAM Logic 622 can, in some instances, determine that a request must be deferred without presenting the request to memory, this is not possible in all situations, as will be discussed below.)

The use of directory state information in conjunction with the Defer CAM Logic 622 is best described by example. Assume a request is made by POD 120A to fetch a cache line of memory in MCL 235A. When the fetch request is selected by Selector 614 for presentation to the addressed memory bank, the request is stored in Defer CAM Logic 622. As discussed above, all fetch requests are stored in Defer CAM Logic 622, including those requests that will be deferred, and those that will not be deferred. During the memory access associated with the fetch request, directory state information is provided by MCL 235A across Address Lines 270A to Directory Logic 628. Assume the directory state information indicates that the MSU owns the requested cache line such that the latest copy of the data resides within the addressed memory bank and not within the cache memory of another POD. Thus, the data may be provided by MCL 235A to the MDA 230 across Bi-Directional Interface 240A, and will be forwarded to POD 120A via Lines 130A.

In addition to the POD 120A receiving the request data, the POD will also receive acknowledge signals that indicate the successful completion of the request. These acknowledge signals, which are generated by Directory Logic 628, are eventually provided to POD Address Control Block 510A, and are then forwarded to POD 120A. Before this occurs, Directory Logic 628 must schedule the movement of the acknowledge signals to POD Address Control Block 510A using control signals on Address Lines 570A. When POD Address Control Block 510A indicates via a control line included in Lines 530A that it is ready to accept the acknowledge signals, the acknowledge signals are sent by Directory Logic 628 via Address Lines 570A to POD Address Control Block 510A. Directory Logic 628 then indicates to Defer CAM Logic 622 via Line 630 that the request address associated with the now-completed request should be removed from Defer CAM Logic 622. This will be discussed further below.

As mentioned above, during a memory operation, Directory Logic 628 receives directory state information associated with the request being processed. This directory state information may indicate that the requested address is exclusively owned by another POD. In the current example, assume that the directory state information associated with the requested fetch data indicates that the data is owned by POD 120B. That is, the data may not be provided to POD 120A because the most recent copy resides within a cache memory of POD 120B. Therefore, Directory Logic 628 must initiate some type of memory coherency operation to maintain the data coherency of the memory system. In this case, the Directory Logic initiates a return operation by making a request on Lines 570A to indicate to POD 120B that the most recent copy of the data at the specified address is to be returned to memory. Directory Logic 628 also indicates via Line 630 to Defer CAM Logic 622 that the temporarily stored fetch request that is currently in progress must be deferred. Eventually, POD 120B will perform a "return" operation. This return operation may or may not include data, depending on whether POD 120B actually modified the data within one of its caches. Assuming the data was modified, the return operation will include data. The returned data will be provided to POD 120A via a transfer of data from the POD Data Block associated with POD 120B (not shown in FIG. 2) to POD Data Block 245 associated with POD 120A. The data is then forwarded to POD 120A. This data transfer is largely beyond the scope of the current invention.

Sometime later, the request associated with the return operation will be presented to Memory Cluster Control Block 520A so that the returned data can be written to memory. When the request is finally presented to Defer CAM Logic 622 in the manner described above, logic within Defer CAM recognizes via the control signals and the request address associated with the request that the request is a return operation. In response, Defer CAM Logic 622 locates the deferred request that originally initiated the return operation, and removes that deferred request from the CAM so that the request is considered complete. The return operation is scheduled for memory to write the modified return data to MCL 235A. During the memory operation, the directory state information associated with the data is modified to reflect the fact that POD 120A now owns the data.

In yet another scenario, assume POD 120B does not return data because the data was not modified within one of its caches. In this case, POD 120B responds by signaling a "return-no-data" request on the control lines of the MI 130A interface. This request will eventually be forwarded to Memory Cluster Control Block 520A. Return-no-data requests are presented to Defer CAM Logic to cause Defer CAM Logic 622 to locate the deferred request that originally initiated the return-no-data operation. When located, the request is marked as undeferred. Additionally, several of the control signals stored in Field 705 of CAM 702 for the request are set to a value that indicates this request is associated with a completed return-no-data operation. Thereafter, the return-no-data request may be discarded.

As a result of receiving the undeterred status, the fetch request will be scheduled for re-presentation to memory. As discussed above, the control signal on Line 627 indicates to Priority Logic 626 that a valid request is ready for presentation to memory on Lines 625. When the request is finally selected by Priority Logic 626, MCL 235A will process the request by forwarding the requested data to MDA 530. Also at this time, Directory Logic 628 will update the directory state information associated with the data to indicate that POD 120A, and not POD 120B, now owns the data, and will further schedule the acknowledge signals to POD Address Control Block 510A. When POD Address Control Block 510A indicates that the acknowledge signals may be sent via Lines 530A in the manner discussed above, the request associated with that data is removed from Defer CAM Logic 622.

It will be noted that the above-described return-no-data/fetch request operation could have been performed as two requests. That is, the return-no-data request could have been presented to MCL 235A to cause the directory state information to be modified from "POD B owns" to "MSU owns", thereby reflecting that the MSU, and not POD B, owns the most current copy of the cache line. Thereafter, the fetch request associated with the return-no-data request could be undeterred and presented to MCL 235A to cause the request data to be returned to POD 120A. This approach, however, requires the presentation of two requests to MCL 235A. By using the above-described method of modifying the control signals associated with the deferred fetch request as stored within CAM 702 to indicate a fetch request is associated with a return-no-data request, the return-no-data request need not be presented to memory and can be discarded. This saves one memory request cycle, and increases memory throughput.

The above examples discuss how the Defer CAM Logic 622 is used to temporarily store all fetch requests, and is also used to store fetch requests after they have become deferred because the requested data is not owned by the MSU 110. The other type of request that may be stored within Defer CAM Logic 622 is I/O overwrite requests. As discussed above, an I/O overwrite request is initiated when one of the Input/Output Modules 140 issues an I/O overwrite command to overwrite a section of memory with new data that is received from the requesting Input/Output Module. When the request is eventually selected for presentation to memory, the directory state information associated with the write data must be updated to reflect that the MSU owns the most recent copy of the data. In addition, when an I/O overwrite operation occurs, the Directory Logic 628 receives the directory state information associated with the affected cache lines, and if any POD has either exclusive or shared ownership of any of the cache lines, a request is sent by Directory Logic 628 for that POD to mark the cached copy as unusable. The manner in which Defer CAM Logic 622 handles I/O overwrite requests will be discussed further below.

The last type of operation that may be issued to memory is a flush operation. Unlike Fetch or I/O overwrite operations, but in a manner similar to return operations, a flush operation is not stored in the Defer CAM Logic 622. Instead, when selected by Selector 614, it is stored by Register 620, and is eventually presented to the MCL associated with the request address.

Figure 7:
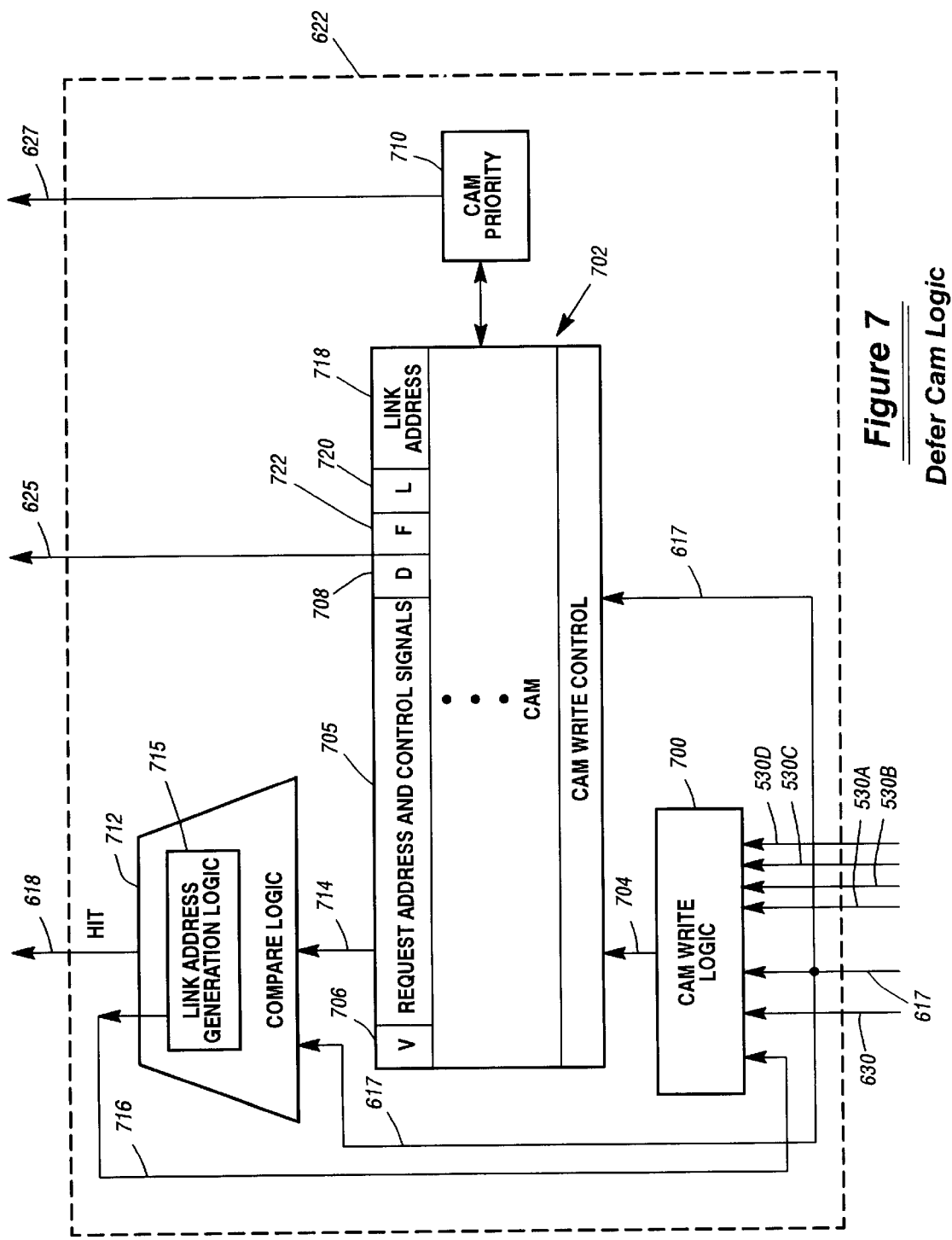
FIG. 7 is a block diagram of the Defer CAM Logic.

FIG. 7 is a block diagram of the Defer CAM Logic 622. As discussed above, requests are provided to Defer CAM Logic 622 on Line 617. CAM Write Logic 700 receives the request signals and uses the included control signals to determine if the request is the type that should be stored in Content Addressable Memory (CAM) 702. CAM 702 stores all fetch requests and I/O overwrite requests, but does not store any flush or return requests. Assuming that the request is of a type that will be stored in CAM 702, CAM write control signals are provided by CAM Write Logic 700 on Line 704 to enable CAM 702 to receive the request address and control signals provided on Line 617.

CAM 702 is capable of storing address and control signals associated with a predetermined number of requests, which in the preferred embodiment is eight. Each addressable storage location within CAM 702 stores address and control signals associated with a different respective request. These signals are shown in FIG. 7 being stored in Field 705 of an addressable location within CAM 702. When a valid request is stored within CAM 702, a valid indicator is set to indicate that the respective CAM address is storing a valid request. The valid, or "V", indicator is shown stored in Field 706 of an addressable location.

As discussed above, all fetch requests are initially stored in CAM 702. The fetch request remains resident within CAM 702 while the associated request signals are presented to the associated MCL, which in this case is MCL 235A. If the requested data is owned by the MSU so that a return operation need not be performed, the data is provided by the MCL to MDA 530, and acknowledge signals are scheduled for transfer to the POD Address Control Block associated with the requesting POD 120. When the associated POD Address Control Block can accept the acknowledge signals as indicated on the one of the interfaces represented by Lines 530A, 530B, 530C, or 530D, CAM Write Logic 700 removes the associated fetch request from CAM 702 by clearing the valid indicator in Field 706 that is associated with the request.

According to another scenario, when the MSU does not own the requested fetch data, a return operation is initiated by sending control signals to the POD 120 that owns the requested data. Because the request can not be completed immediately, the request is said to be deferred, as is indicated by control signals on Line 630 provided by Directory Logic 628 to CAM Write Logic 700. In response to these signals, CAM Write Logic 700 causes a deferred, or "D", indicator to be set for the associated request. This indicator is shown in Field 708 within CAM 702 of FIG. 7.

In addition to providing control signals on Line 630, Directory Logic 628 also initiates a return operation on the interface shown as Line 570A to the respective POD 120 that owns the requested data. In this case, the copy of the data stored within one of the caches in the associated POD 120 may, or may not have, been updated. If the data has been updated, the POD eventually returns the modified data on the respective Data Interface 210 to MDA 230. The modified data is immediately provided to the requesting POD 120 via a POD-to-POD data transfer that is accomplished by moving that data from the POD Data Block associated with the POD returning the data to the POD Data Block associated with the requesting POD. The modified data is also temporarily stored until it can be written to the addressed MCL 235. The address and control signals associated with this memory write operation are queued within MCA 250, and are eventually presented to Defer CAM Logic 622. Since the operation is associated with a return request, the signals are not stored in the CAM 702. However, presentation of the return request signals to CAM Write Logic 700 causes CAM Write Logic 700 to remove the deferred request from CAM 702 by clearing the valid indicator in Field 706. The deferred request that is to be removed is identified using the address and control signals on Lines 530A that accompany the request, and which match the address and control signals stored in Field 705 of CAM 702. The deferred fetch request is now considered complete. The return request will be completed to update the cache line data in MCL 235, and to also update the directory state information associated with the cache line to reflect that a different POD 120 now owns the data.

In yet another scenario, when the return operation is initiated to the POD owning requested data, it was determined by the POD that the data had not been updated in a local cache. In this situation, the POD performs a return-without-data operation, which is a return operation that does not include data. This return operation is a request that is scheduled to the MCA in the same manner other requests are queued. When the request is selected for presentation to Defer CAM Logic, the CAM Write Logic 700 recognizes the request type and responds by clearing the defer indicator in Field 708 for the fetch request that initiated the return operation. The return request is then presented to the addressed MCL 235A so that the directory state information associated with the requested data is updated to reflect the fact that the MCL owns, and stores the most recent copy, of the data. Sometime after the return request is completed, the fetch request associated with the return operation, which now has obtained an undeterred status, is selected by CAM Priority Logic 710 to be presented on Line 625. This selection of a valid undeterred request is initiated by the generation of a control signal on Line 627, which is provided to Priority Logic 626. This causes Priority Logic 626 to select the undeterred fetch request for presentation to MCL 235A so that the requested data may be provided to the requesting POD. This fetch request will be removed from CAM 702 by clearing the valid indicator once it is indicated on one of the interfaces on Lines 530A, 530B, 530C, or 530D that the POD Address Control Block for the POD receiving the data is ready to accept the associated acknowledge signals from Memory Cluster Control Block 520A. As discussed above, this indicates that the data has been provided from memory and the request may be considered complete.

The above discussion describes the manner in which all fetch requests are handled by Defer CAM Logic 622. Defer CAM Logic 622 also includes logic to defer Fetch and I/O overwrite requests that are requesting access to addresses that are already associated with a deferred request. This functionality is best explained by example. Assume a fetch request to MCL 235A from POD 120A has been deferred within CAM 702, and an associated return operation has been initiated to retrieve data from POD 120B for that request. As described above, this occurs because MCL 235A does not necessarily store the most recent copy of the data. Assume further that POD 120C issues a subsequent request for that same cache line of data. If the request is selected for presentation to memory, another return operation will be initiated, since the MSU does not own the requested data.

The presentation of the subsequent request to memory slows system operation in at least the following respects. First, memory cycles are used by MCL 235A to determine that the MSU does not own the requested data. This time could be utilized processing another request. Additionally, the subsequent return operation requires handling within queue logic within POD Address Control Block 510B and further uses bus cycles being transferred from POD Address Control Block 510B to POD 120B. POD 120B will also be forced to process a return request that has, in effect, already been handled because of the previous request initiated by POD 120A. The subsequent response by POD 120B will also unnecessarily utilize bus cycles on MI Interface 130E.

To improve system performance by preventing the presentation of the subsequent request to MCL 235A, the address signals associated with any fetch request are always compared to the address signals associated with every valid request stored within CAM 702. This compare is performed by Compare Logic 712, which compares the current request address signals on Line 617 to all other valid stored addresses from CAM 702, as are provided to Compare Logic 712 on the interface shown as Line 714. If one or more addresses from CAM 702 match the current request address, the current request will be deferred for later processing. To accomplish this, Link Address Generation Logic 715 included in Compare Logic 712 generates a CAM address on the interface shown as Line 716. This CAM address points to an address within CAM 702 that stores one of the requests having request address signals that favorably compare to the address signals for the current request. In the preferred embodiment, a favorable comparison occurs when the address signals of the current request are the same as the address signals associated with any request stored in CAM 702. CAM Write Logic 700 writes the current request to CAM 702, sets the valid and deferred indicators in Fields 706 and 708, respectively, and writes the CAM address into Field 718.

It may be noted that the address signals associated with more than one request may favorably compare with the current request. When this occurs, the current request is linked via the address link stored in Field 718 to the CAM address storing the most recent of the other requests. The most recent of the requests is indicated by the setting of the "Last", or "L", indicator shown stored in Field 720 of each of the addressable locations within CAM 702. In a similar manner, the oldest pending request associated with a given request address is designated by setting a "First", or "F", indicator shown stored in Field 722 of each of the addressable locations within CAM 702. In this manner, a linked list of requests associated with the same request address is stored within CAM 702. If only a single request is stored in CAM 702 for a given request address, both the "F" and "L" indicators in Fields 722 and 720, respectively, are set.

In addition to generating a CAM address on the interface shown as Line 716, Compare Logic 712 also indicates a compare match with the current request address by providing Hit Indicator on Line 618 to Priority Logic 616. In response, Priority Logic causes Selector 614 to select another request that will be loaded into Register 620 to overwrite the current, now-deferred, request. Assuming that this newly-loaded request is not also deferred, this new request will be presented to MCL 235A instead of the previous overwritten request, thereby preventing the wasting of both memory cycles, bus cycles, and cycles for processing the return request. The timing associated with the loading of the new request occurs so that no memory cycles are wasted, as will be discussed further below in reference to memory timing.

When a linked list of deferred requests is stored in CAM 702, request processing for that linked list of requests occurs on a first-in, first-out basis. The oldest request, which is the request having the "F" indicator set in field 722, will be completed first as the result of the completion of the first coherency operation associated with the request address. This may be as the result of a return operation that included data, which causes the associated deferred request to be removed from CAM 702 in the manner discussed above. Alternatively, the request may be completed as the result of a return-no-data operation which will initially cause the request to receive undeterred status so it can be represented to memory and eventually completed in the above-described manner. In either case, the oldest deferred request for a particular address will eventually be removed from CAM 702. If the removed request is chained to a second (subsequently-received) request through the link address field of the second request as stored in Field 718, CAM Write Logic causes the second request to receive undeterred status at the time the older request is removed from the CAM. Also at this time, the link address in Field 718 of the second request is set to zero to indicate that the request is no longer linked to another request. The second request then becomes eligible for presentation to MCL 235A. In this manner, for a linked list of requests associated with the same requested address, the requests will be processed in order from the oldest request to the most recently received request as is indicated by the link address fields of those requests.

The use of the compare function within Defer CAM Logic 622 is best described by returning to the current example. In this example, assume a fetch request from POD 120A is stored within address "zero" of CAM 702 and is deferred waiting for a return operation to be performed by POD 120B. Further assume that the request is the only deferred request stored in CAM 702 that is associated with that particular address, and the "F" and "L" bits associated with the CAM entry are therefor set. A subsequent fetch request is issued by POD 120C for the cache line stored at the address associated with the deferred request from POD 120A. Compare Logic 712 detects that the address stored in address "zero" of CAM 702 is equivalent to the address associated with the current request and generates indicators indicative of CAM address "zero" on the interface shown as Line 716. In response, CAM Write Logic 700 stores the current request within CAM 702 at an available CAM address as determined by CAM Write Logic 700. Assume for the current example that the request is written to address "two". CAM Write Logic also sets the deferred and valid indicators within Fields 708 and 706, respectively, within the entry stored at CAM address "two". The link address in Field 718 is set to "zero" to indicate that the related request is stored at CAM address "zero". In addition, the "L" bit associated with the CAM entry storing the original request is cleared, and the "L" bit associated with the CAM entry storing the current request is set. This indicates that the current request is the most recent, or last, request that is associated with the particular request address and that is stored within CAM 702.

As discussed above, a yet further request may be made to the same address associated with the two deferred requests of the current example. Assume a later fetch request to this address is made by POD 120D. Compare Logic 712 detects that the request address from POD 120D is equivalent to that stored both at addresses "zero" and "two" within CAM 702. Compare Logic 712 provides indicators indicative of the CAM address storing the entry for which the "L" bit is set, which in the current example is CAM address "two". Therefor, the new request is stored in CAM 702 with the link address in Field 718 storing a "two", and with the "L" bit in Field 720 set. The "L" bit in the entry stored at CAM address "two" is cleared.

Deferred I/O Overwrite and Flush Requests

As mentioned above, I/O Modules 140 may make an I/O overwrite request, which causes new data received from the requesting I/O Module to be written to memory at the request address. In addition, when an I/O overwrite operation occurs, any PODs 120 storing copies of the data for read-only purposes must be informed that the data copies are to be marked as invalid so that the copies are no longer used. Alternatively, if any POD owns the data such that the data copy may be modified, that POD must return the data to the MSU before the I/O overwrite operation may be completed. These operations are accomplished by MSU 110 issuing a purge request to each of the POD(s) storing copies of the data associated with the I/O overwrite request. The I/O overwrite request is stored in CAM 702 and marked as deferred until the purge requests are completed, or until a POD with data write privileges returns the data to the MSU.

Because of the manner in which the purge mechanism operates in the preferred embodiment, an I/O overwrite request must not be allowed to by-pass a deferred fetch request for the same address. If this occurs, the fetch request could result in initiation of a return request that is received by a POD after the POD has processed the purge request for that address, but before the directory state information in memory is updated. The return request is therefor requesting the return of invalidated, or purged, data. This results in an error. I/O overwrite requests made to the same address as a deferred request are therefore deferred in the same manner described above with respect to fetch requests. That is, an I/O overwrite request is presented to Defer CAM Logic 622, and if the associated request address is equivalent to an address already stored in CAM 702, the I/O overwrite request address and control signals are stored in CAM 702. The various fields within the associated request entry are utilized in the manner described above with respect to fetch requests.

A fetch request associated with the same address as a previously deferred I/O overwrite request is processed is the same manner described above with respect to other fetch requests. The fetch request information is stored in CAM 702, and the fetch request entry is chained to the CAM entry associated with the I/O overwrite request in the manner described above using the link address in Field 718. In contrast, flush requests that are made to the same address as a deferred I/O overwrite request are discarded without being presented to memory because the flush request has data that is outdated.

Figure 8:
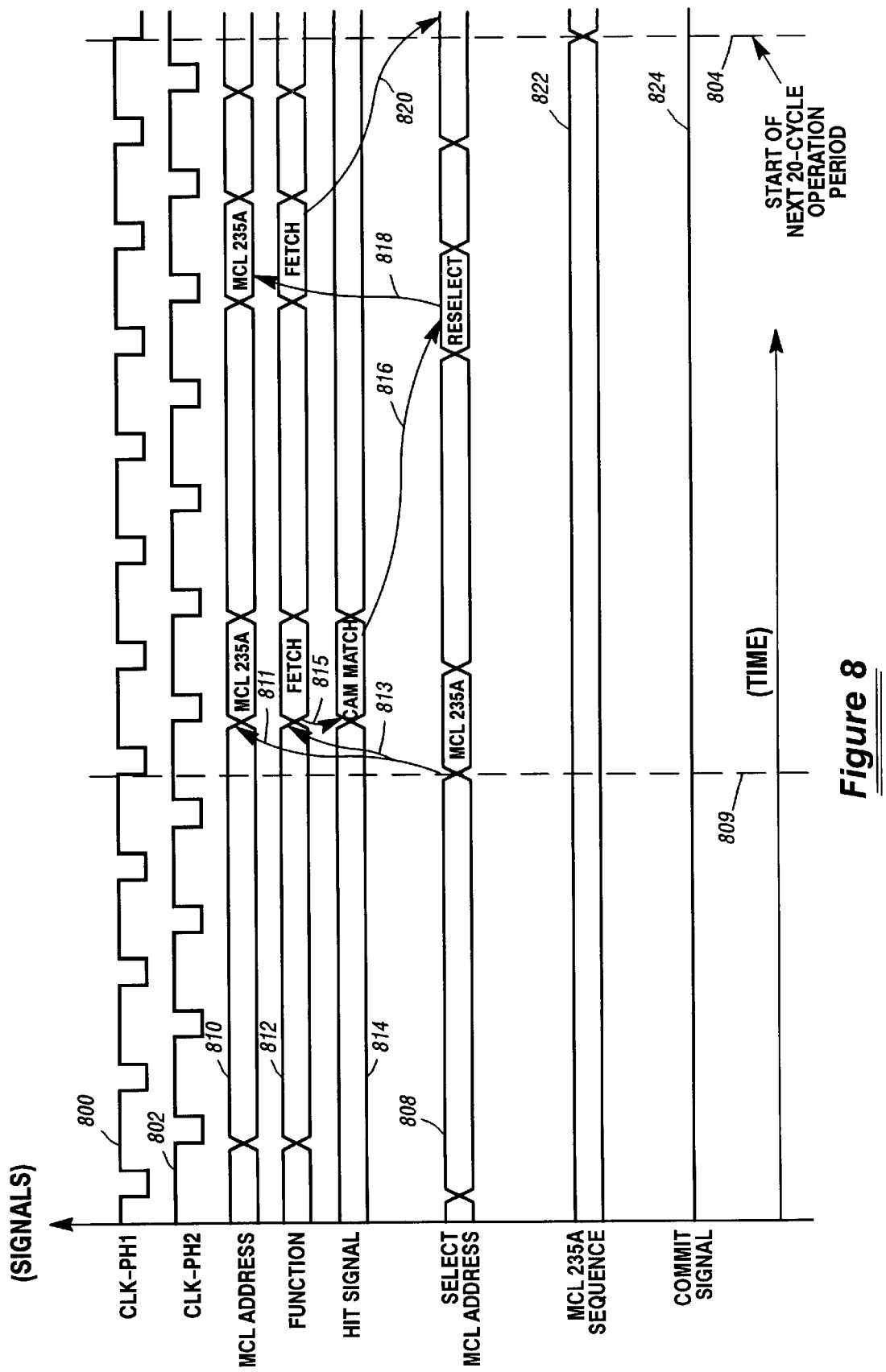
FIG. 8 is a timing diagram showing the timing associated with the entry of a deferred request within the CAM.

FIG. 8 is a timing diagram showing the timing associated with the entry of a deferred request within CAM 702. The MSU 110 includes a two-phase clock, with Phase 1 being shown as Waveform 800, and Phase 2 being shown as Waveform 802. Each of these clock signals has a period of ten nanoseconds. As discussed above, each of the MCLs 235A, 235B, 235C, and 235D begins a new request every 20 clock cycles. In FIG. 8, request execution for the next request is to be started by MCL 235A at the time indicated by Line 804.

Approximately seven clock cycles before MCL 235A is to begin execution of the next request, Priority Logic 616 (of FIG. 6) selects the next pending request from the one Queues 606, 608, 610, and 612 that is associated with MCL 235A. The selection of this request is shown by Waveform 808 and occurs at the time indicated by Line 809. Thereafter, this selected request is latched by Register 620, and is further selected by Selector 624 for presentation to MCL 235A via Address Lines 270A. The presentation of the request address and function onto Address Lines 270A is represented by Waveforms 810 and 812, respectively, as shown by Arrows 811 and 813, respectively. For this example, the address associated with the request indicates the request is mapped to MCL 235A, and the function associated with this request indicates the request is a "Fetch".

While the Address and Function for the request are being driven onto Lines 270A, these signals are also provided to Defer CAM Logic 622 for processing in the manner discussed above. If the request address matches a deferred request, Hit Signal is asserted, as indicated by Waveform 814 and Arrow 815. As a result, Priority Logic 616 selects another request from the appropriate one of the Queues 606–612, as indicated by Waveform 808 and Arrow 816.

The new address and function is propagated to Address Lines 270A, as indicated by Waveforms 810 and 812 and Arrow 818. The new request is also presented to Defer CAM Logic 622. In this instance, no address match occurs, and the Hit Signal 618 is therefor not asserted. This is indicated by Waveform 814. As a result, the MCL 235A address shown by Waveform 810 is available for the start of the next 20-cycle memory window at the time indicated by Line 804, as illustrated by Arrow 820. A new operation commences at this time, as indicated by the start of the MCL 235A sequences and the assertion of the Commit Signal, as shown on Waveforms 822 and 824, respectively. In this manner, the deferred request does not cause a cycle-slip in the memory; that is, no clock cycles are wasted waiting for the availability of the next request.

While various embodiments of the present invention have been described above, it should be understood that they have been presented by way of example only, and not as a limitation. Thus, the breadth and scope of the present invention should not be limited by any of the above-described exemplary embodiments, but should be defined only in accordance with the following claims and their equivalents.

What is claimed is:

1. For use in a data processing system including multiple data processors coupled to a shared main memory, the shared main memory for receiving requests from the data processors to access a data item in the shared main memory, ones of the data processors being coupled to one or more cache memories for storing the data items retrieved from the shared main memory, and wherein the shared main memory stores directory state information that is used to determine when coherency operations must be initiated to maintain memory coherency between the shared main memory and the cache memories, a system for filtering ones of the requests received by the main memory, comprising:

a storage device to store predetermined ones of the requests until processing of the requests is completed;

directory logic coupled to said storage device, said directory logic to receive the directory state information from the shared main memory and to designate ones of said stored requests as deferred requests, wherein each of said deferred requests will only be designated as completely processed when an associated predetermined one of said coherency operations is completed;

compare logic coupled to said storage device to receive each of said predetermined ones of the requests as said predetermined ones of the requests are provided by the data processors, and to generate, for each of said predetermined ones of the requests, compare signals if one or more of said stored requests is requesting access to the same data item as any other received one of said predetermined ones of the requests wherein said compare logic includes link address generation circuits to generate said compare signals to include, for each of said predetermined ones of the requests that is requesting access to the same data item as one or more of said stored requests, a respective link address, said respective link address to point to an address within said storage device that stores a predetermined one of said one or more stored requests that is requesting access to the same data item as said each of said predetermined ones of the requests; and storage write control logic coupled to said compare logic to receive said compare signals, and to cause any requests for which compare signals were generated by said compare logic to be stored in said storage device as deferred requests.

2. The system of claim 1, wherein said storage device is a Content Addressable Memory.

3. The system of claim 1, wherein said storage write control logic includes selection circuits to select as said predetermined ones of the requests those requests that are fetch requests for requesting that a selected one of the data items be retrieved from the shared memory.

4. The system of claim 1, wherein the data processing system further includes I/O modules to make I/O overwrite requests to the shared main memory, each of said I/O overwrite requests requesting access to selected data items in memory, and wherein said compare logic includes circuits to receive each of said I/O overwrite requests, and to generate ones of said compare signals for each of said I/O overwrite requests that is requesting access to the same data item as one or more of said stored requests.

5. The system of claim 4, wherein said storage write control logic includes I/O overwrite request control circuits to cause any of said I/O overwrite requests for which compare signals are generated to be stored in said storage device as deferred requests.

6. The system of claim 1, wherein said storage device includes circuits to store, for each of said stored requests, said respective link address.

7. The system of claim 1, wherein said link address generation circuits include circuits to generation each said respective link address to point to the one of said one or more stored requests that was most recently stored in said storage device.

8. The system of claim 1, wherein said storage write control logic is coupled to receive control signals generated in response to said directory logic indicating the completion of predetermined ones of the coherency actions, and wherein said storage write control logic includes circuits to cause a respective one of said deferred requests to be designated as undeterred in response to receiving said control signals.

9. The system of claim 1, wherein each of the requests includes control signals indicating the type of request being made, wherein said storage write control logic is coupled to receive control signals generated in response to said directory logic indicating the completion of predetermined ones of the coherency actions, and wherein said storage write control logic includes circuits to modify the control signals of a respective one of said deferred requests to record the completion of an associated one of said predetermined ones of the coherency actions, and to further designate said respective one of said deferred requests as undeterred.

10. The system of claim 1, wherein said storage write control logic is coupled to receive control signals indicating the completion of a respective one of said stored requests, and wherein said storage write control logic includes circuits to cause said respective one of said stored requests to be removed from said storage device.

11. For use in a shared main memory for storing data items and coupled to receive memory requests from multiple cache memories, the shared main memory having a directory-based coherency scheme for maintaining memory coherency by initiating coherency actions in response to ones of the memory requests made by one of the cache memories for data items for which the most recent copy is stored within a different one of the cache memories, the shared main memory further having a request storage structure to temporarily store ones of the memory requests, a method of managing memory requests, comprising the steps of:

a.) storing in the request storage structure predetermined ones of the memory requests;

b.) presenting a selected one of the requests stored in step a.) to memory according to a predetermined priority scheme;

c.) designating as a deferred request any request presented to memory in step b) that is made by one of the cache memories for a data item for which the most recent copy is stored within a different one of the cache memories;

d.) initiating for each said deferred request an associated coherency action to obtain the most recent copy of a data item; and e.) temporarily preventing any newly-received one of said predetermined ones of the memory requests from being presented to the shared main memory if said any newly-received one of said predetermined ones of the memory requests is requesting access to any data item requested by any said deferred request, wherein Step e. further comprises:

e1) storing in the request storage structure said any newly-received ones of said predetermined ones of the memory requests that are requesting access to any of the same ones of the data items requested by any said deferred request, said storing including the step of associating a respective one of said deferred requests with each of said requests stored in this step e1), wherein said respective one of said deferred requests is requesting access to the same one of the data items that is requested by the associated one of said requests stored in this step e1); and e2) marking all requests stored in step e1) as ones of said deferred requests.

12. The method of claim 11, and further including the step of:

removing from the request storage structure one of the memory requests that was previously designated as deferred upon completion of said associated coherency action if said associated coherency action resulted in a most-recent copy of a requested data item being provided to the cache memory requesting said requested data item.

13. The method of claim 11, and further including the step of:

f.) designating one of the memory requests that was previously designated as deferred as undeferred upon completion of said associated coherency action.

14. The method of claim 13, and further including the step of:

g.) presenting a selected one of the requests designated in step f.) as being undeferred to the shared main memory according to a predetermined priority scheme.

15. The method of claim 11, wherein said associating step of step e1) include the steps of:

determining the address within the request storage structure at which said respective one of said deferred requests is stored; and storing within the request storage structure in association with any said associated one of said requests stored in step e1) said address determined in said determining step.

16. The method of claim 15, wherein said determining step includes the step of selecting the most-recently deferred one of all of said deferred requests that are requesting access to the same data item requested by said associated one of said requests stored in step e1) for use as said respective one of said deferred requests.

17. The method of claim 11, wherein the shared main memory is further coupled to peripheral units to receive from the peripheral units I/O requests requesting access to the shared main memory, and wherein step a.) further includes the step of storing in the request storage structure predetermined ones of the I/O requests.

18. The method of claim 17, and further including the step of:

designating as a deferred request any of said predetermined ones of the I/O requests that are requesting access to the same data item requested by any other ones of said deferred requests.

19. The method of claim 17, and further including the step of:

f.) designating a predetermined one of said deferred requests as undeferred upon completion of said associated coherency action.

* * * * *